United States Patent
Hall et al.

(10) Patent No.: US 9,261,577 B2
(45) Date of Patent: *Feb. 16, 2016

(54) ESTIMATING USER DEVICE LOCATION IN A WIRELESS NETWORK

(75) Inventors: Steven Raymond Hall, Harlow (GB); Andrew Jeffries, Saffron Walden (GB); David Bevan, Bishops Stortford (GB); Steven Baines, Bishops Stortford (GB)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/539,468

(22) Filed: Jul. 1, 2012

(65) Prior Publication Data

US 2012/0329477 A1  Dec. 27, 2012

Related U.S. Application Data (63) Continuation of application No. 12/565,100, filed on Sep. 23, 2009, now Pat. No. 8,243,626.

(51) Int. Cl.
*H04W 24/00* (2009.01)
*G01S 5/02* (2010.01)
*H04W 64/00* (2009.01)

(52) U.S. Cl.
CPC .............. *G01S 5/0252* (2013.01); *G01S 5/0221* (2013.01); *H04W 64/00* (2013.01)

(58) Field of Classification Search
CPC ....... H04W 4/02; H04W 40/20; H04W 64/00; G01S 5/30; G01S 5/0063; G01S 5/0027; G01S 19/01; G01S 19/07; G01S 19/0127; G01S 19/31–19/33; G01S 19/39; G01S 19/48; G01S 5/0257; G01S 5/0278; G01S 5/0221; G01S 5/0252

USPC ............ 370/310.02, 328, 332, 338, 412, 255; 455/456.1, 456.2, 525

See application file for complete search history.

(56) References Cited

U.S. PATENT DOCUMENTS

| 6,275,707 B1 | 8/2001 | Reed et al. |
| 6,990,428 B1 | 1/2006 | Kaiser et al. |

(Continued)

FOREIGN PATENT DOCUMENTS

| JP | 2002142246 | 5/2002 |
| JP | 2006080681 | 3/2006 |

(Continued)

OTHER PUBLICATIONS

International Search Report and Written Opinion in European Patent Application No. 10785170.1-1248, May 3, 2012, pp. 1-10.

(Continued)

*Primary Examiner* — Charles C Jiang
*Assistant Examiner* — Mohamed Kamara
(74) *Attorney, Agent, or Firm* — Meyertons, Hood, Kivlin, Kowert & Goetzel, P.C.

(57) ABSTRACT

A method of estimating user location involving collecting data from the access points in the network. The data can then be used to define a relationship, for example the loss of power experienced by a transmitted signal, between the access points. The relationship can be stored within a matrix, database or any other suitable storage method that can be referenced to determine the position of a user device within the network and correlated with corresponding measurements from a user device to determine the location of the user device within the network.

20 Claims, 5 Drawing Sheets

(56) References Cited

U.S. PATENT DOCUMENTS

| | | |
|---|---|---|
| 7,574,230 B1 | 8/2009 | Oh et al. |
| 8,681,713 B2 * | 3/2014 | Hamabe et al. ............... 370/329 |
| 8,994,591 B2 * | 3/2015 | Dupray et al. ................ 342/457 |
| 2002/0068581 A1 * | 6/2002 | Salonaho ....................... 455/456 |
| 2003/0108009 A1 * | 6/2003 | Petersen ....................... 370/338 |
| 2004/0102198 A1 | 5/2004 | Diener et al. |
| 2005/0227724 A1 * | 10/2005 | Tsai .............................. 455/525 |
| 2005/0267677 A1 * | 12/2005 | Poykko et al. ................ 701/207 |
| 2005/0285793 A1 | 12/2005 | Sugar et al. |
| 2006/0025153 A1 * | 2/2006 | Inaba ......................... 455/456.1 |
| 2006/0075131 A1 | 4/2006 | Douglas et al. |
| 2007/0201421 A1 * | 8/2007 | Huseth .......................... 370/338 |
| 2008/0032705 A1 * | 2/2008 | Patel et al. .................. 455/456.1 |
| 2009/0082034 A1 * | 3/2009 | Gray et al. ................. 455/456.1 |
| 2010/0134309 A1 * | 6/2010 | Cutler et al. ................ 340/686.1 |
| 2010/0309051 A1 | 12/2010 | Moshfeghi |
| 2011/0034179 A1 | 2/2011 | David et al. |
| 2013/0012230 A1 * | 1/2013 | Alles et al. ................. 455/456.1 |
| 2013/0184003 A1 * | 7/2013 | Alizadeh-Shabdiz et al. ........................... 455/456.1 |

FOREIGN PATENT DOCUMENTS

| | | |
|---|---|---|
| JP | 2007231473 | 9/2007 |
| JP | 2010051840 | 3/2010 |

OTHER PUBLICATIONS

Kitasuka et al.; "Wireless LAN Based Indoor Positioning System WiPS and its Simulation;" IEEE Pacific Rim Conference on Communications, Computers, and Signal Processing (PACRIM), Victoria, BC, Canada, Aug. 28-30, 2003, ISBN: 978-0-7803-7978-7; pp. 272-275.

Son et al.; "Positioning System using Dynamic Location-convergence Adjustment Factor for Wireless LAN Infrastructures;" Proceedings of the Sixth IEEE International Conference on Computer and Information Technology (CIT '06), Sep. 2006, ISBN: 978-0-7695-2687-4; pp. 1-6.

Notice of Allowance from Japanese Application No. 2012530340, issued Mar. 2, 2015, Japanese version, pp. 1-3.

* cited by examiner

ESTIMATING USER DEVICE LOCATION IN A WIRELESS NETWORK

PRIORITY CLAIM

This application is a continuation application of U.S. patent application Ser. No. 12/565,100 titled "Estimating User Device Location in a Wireless Network", filed on Sep. 23, 2009, which is hereby incorporated by reference in its entirety as though fully and completely set forth herein.

FIELD OF THE INVENTION

This invention relates to a method of estimating user device location within a wireless network. The invention also relates to an apparatus able to estimate the same.

BACKGROUND OF THE INVENTION

Wireless networks include, amongst other things, access points and user devices. User devices can be any device with an interface capable of enabling wireless networking using a wireless network, including, for example, laptops. Access points are devices which enable a user device to access a particular wireless network using, for example, Bluetooth or Wi-Fi. Once a user device has access to a wireless network it can send and receive data over the network.

It can be useful to estimate a user's location within a wireless network, for example if the services provided to a user device are dependent upon the location of the user device within the network. This is of particular difficulty when the user devices are mobile and therefore the components in the network are not static in nature.

In order to determine the location of devices within networks that can be accessed by mobile devices several solutions have been proposed. These include RF fingerprinting, time of arrival trilateration and use of a GPS device on the mobile device.

RF fingerprinting involves a survey of the area covered by the wireless network and evaluating the RF spectrum at certain points within the area. The system, or the mobile unit itself, can determine the RF spectrum of the user device and compare it to the RF spectrum of different points in the area as measured from the survey. This comparison can be used to define where the user device is in the network. However, this method of location determination requires resources to determine the received RF spectrum of points within the area. Furthermore, dynamics within the RF environment of the area can change, increasing the error in location estimation.

Time of arrival trilateration involves access points determining the time of flight for a transmission from a user device to the access point. From this time of flight a distance from the access point can be determined and the meeting point of these distances is an estimate of the location of the user device. However, to accurately estimate location using time of arrival trilateration requires a user device to be able to communicate with at least three access points within the network which may mean that the number of access points required to estimate location is greater than that required to service the network. Additionally, the estimation of time must be accurate with differences between the clocks on the user device and those on the access points resulting in time, and hence location, estimation errors.

Finally, the use of a GPS receiver, or other location determination equipment, in the user device can be used to determine the location of the user device. However, this is dependent upon the visibility of satellites at the point where the user device is located which may not be possible within a building. Providing each user device with a GPS receiver can also be costly.

Therefore, it is desirable to have an improved way of estimating the location of a user device in a wireless network.

SUMMARY OF THE INVENTION

In accordance with an aspect of the present invention there is provided a method of estimating location of a user device in a wireless network, the wireless network including a plurality of access points, the method including the steps of: determining channel loss between the user device and one of the plurality of access points; calculating a correlation value for at least one of the plurality of access points, the correlation value for an access point being a measure of the correlation between the channel loss between the user device and at least the one of the plurality of access points and the channel loss between the access point and each of the plurality of access points; and estimating the location of the user device from a known location of at least one access point and the correlation value for at least one access point.

The channel loss may be the measurement ascribed to any feature which is proportional to the loss of power of a signal transmitted across the network. It may be, for example, the received power of a signal transmitted between two access points, provided that the transmitted power of the signal is the same for all access points within the network. Alternatively it may be the signal to noise ratio for the same signal or the estimated power loss for the signal calculated by subtracting the power of a signal received by an access point from the power that the signal was transmitted at.

Optionally, the method may include the steps of normalising the calculated channel loss for the access point and each of the plurality of access points to determine a normalised access point channel loss and normalising the channel loss between the user device and at least one of the plurality of access points to determine a normalised user device channel loss, wherein the correlation value is a measure of the normalised access point channel loss and normalised user device channel loss. By normalising the channel path loss (i.e. re-aligning values with respect to the mean channel loss for the set of path losses to the access points) a meaningful correlation value based on the matching of the pattern of path losses can be found. The correlations values should be between 1 and −1.

Estimating the user location may comprise normalising the correlated values prior to estimating the location of the user device. Further, estimating the location of the user device comprises multiplying vector locations of each access point by the normalised correlated values for that access point and adding the weighted vector locations together.

The method may include the step of determining a set of channel losses between the user device and a number of the plurality of access points and calculating correlation values by measuring the set of channel losses and another set of channel losses the other set of channel losses being a set of channel losses between the access point and the plurality of access points.

The location of the user device may be estimated using a selected number of the plurality of access points rather than measurements from all the access points in the network. The selected access points may be, for example, the access points situated such that they can receive a signal from the user device or the number of access points with the greatest correlation value with the user device channel loss.

Advantageously a plurality of correlation values may be calculated. Each correlation value being between the user device and a different access point in the network. Further, a set of channel loss values for the user device may be calculated, each channel loss value being between the user device and a different access point in a set of access points. The correlation value may be the correlation between the set of channel loss values calculated for the user device and a set of channel loss values between each access point and the corresponding set of access points.

Optionally, the wireless network may be provided with a sensor or set of sensors. In this instance the correlation value formed is a measure of the correlation between the channel loss between the user device and at least one of the plurality of access points and the channel loss between that access point and each of the plurality of access points and sensors.

Alternatively, the method may include determining the angle of arrival of a transmission from the user device to one of the plurality of access points, estimating the distance of the user device from the one of the plurality of access points from the loss of power of a signal transmitted between the user device and the one of the plurality of access points and estimating the location of the user device using the angle of arrival and the determined distance. The angle of arrival is calculated using any suitable method for the two access points having the highest correlation value.

Optionally, a confidence value may be calculated for the estimation of user location. This confidence value may be based, for example, upon the error value in the channel loss measurements or the size of the area within which the user device is estimated to be located.

According to a second aspect of the present invention there is provided apparatus configured to estimate location of a user device in a wireless network, the wireless network comprising a plurality of access points and a user device, the apparatus being arranged configured to: determine channel loss between the user device and at least one of the plurality of access points; calculate a correlation value for at least one of the plurality of access points, the correlation value for an access point being a measure of the correlation between the channel loss between the user device and at least the one of the plurality of access points and the channel loss between the access point and each of the plurality of access points; and; estimate the location of the user device from a known location of at least one access point and the correlation value for the at least one access point.

The apparatus may be a network controller.

Optionally, the apparatus may include an input configured to receive a measurement of path received signal strength and uses the measurement of received signal strength to calculate channel loss. The apparatus may include a database of access points (with known locations) and the channel losses between each access point and the plurality of access points in the network.

In accordance with an aspect of the present invention there is provided a computer program stored on a computer readable medium and which, when executed on an apparatus, causes the apparatus to perform the steps of: determining channel loss between the user device and one of the plurality of access points; calculating a correlation value for at least one of the plurality of access points, the correlation value for an access point being a measure of the correlation between the channel loss between the user device and at least the one of the plurality of access points and the channel loss between the access point and each of the plurality of access points; and estimating the location of the user device from a known location of at least one access point and the correlation value for at least one access point.

BRIEF DESCRIPTION OF THE DRAWINGS

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 1:
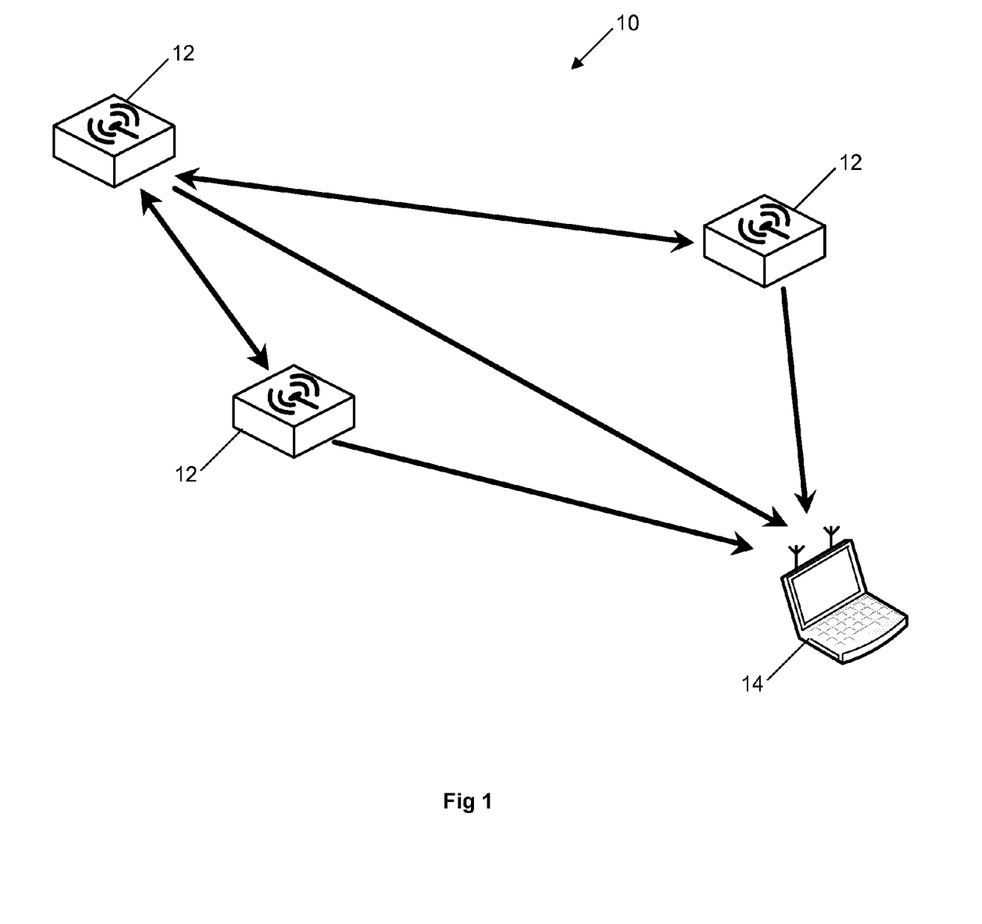
FIG. 1 depicts a schematic view of a wireless network in which the invention may be implemented.

The invention will be described with reference to a single wireless network, such as the network 10 illustrated in FIG. 1. The wireless network 10 including a plurality of access points 12 and at least one user device 14. The wireless network's connectivity with user devices may be determined by a network controller (not shown). As will be understood by the skilled person the access points 12 and wireless network 10 may be implemented in any known manner. The user device 14 may be, for example, a laptop, netbook or any other device with an interface capable of enabling wireless networking using the wireless network. Additionally, although the invention is described with relation to a single wireless network the skilled person will understand that it can be implemented over multiple networks.

The method involves collecting data from the access points in the network. The data can then be used to define a relationship, for example the loss of power experienced by a transmitted signal, between the access points. The relationship can be stored within a matrix, database or any other suitable storage method that can be referenced to determine the position of a user device within the network and correlated with corresponding measurements from a user device to determine the location of the user device within the network as described in more detail below.

Figure 2:
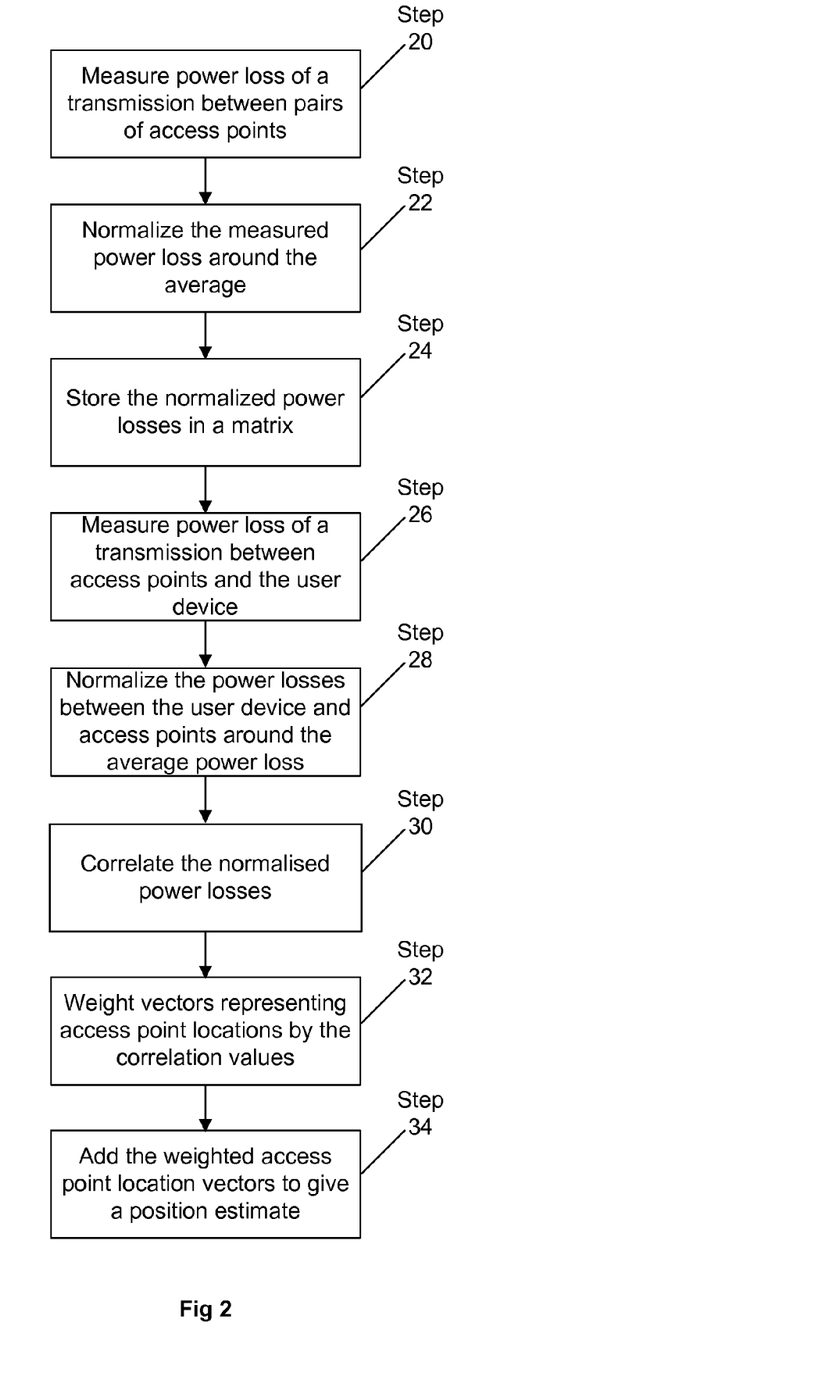
FIG. 2 is a flow diagram of a method in accordance with the present invention.

The method is illustrated in more detail in FIG. 2. In this method, each pair of access points in the network transmits a signal from one access point in the pair to the other access point in the pair. The access points record the power that the signal is transmitted at and the power that the signal is received at. The loss in power of a signal transmitted between the access points can then be determined by calculating the power difference between the transmitted signal and the received signal (Step 20).

Figure 3A:
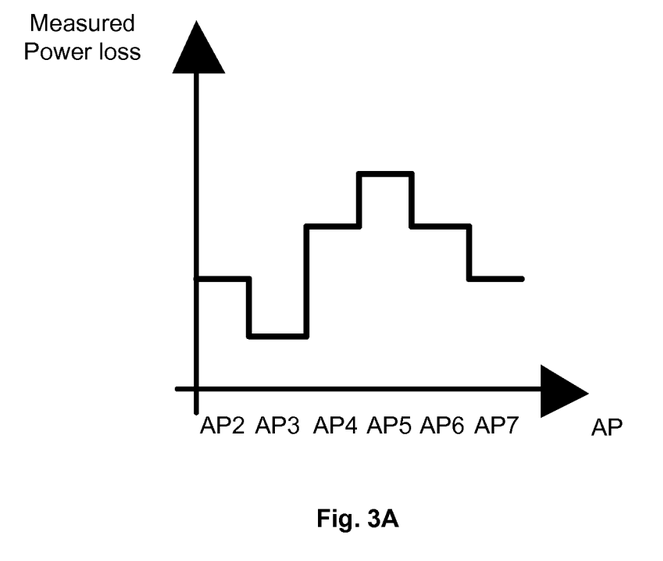
FIG. 3A is a graphical depiction of power loss measures between access points in a wireless network of the invention.
Figure 3B:
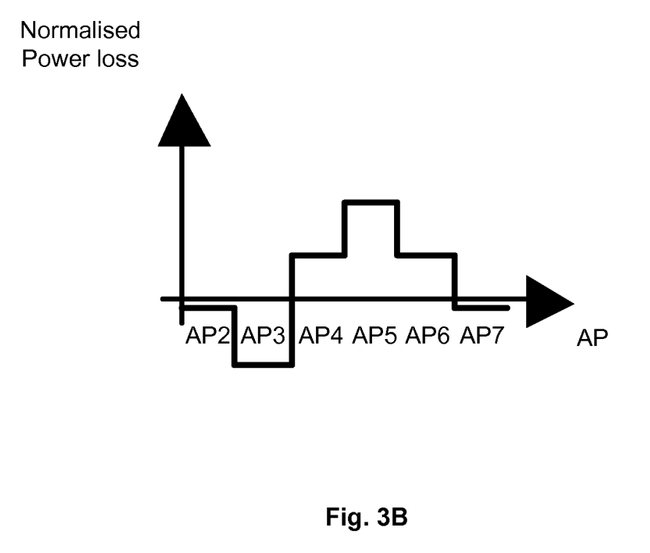
FIG. 3B is a graphical depiction of a normalization of power loss measured between access points of FIG. 3A.

The power loss between each of the pairs of access points in the wireless network is shown in FIG. 3A. Normalization about the average power loss (Step 22), is shown in FIG. 3B. The difference between the actual power loss to the access point and the average power loss for that access point is determined. A table, such as that shown below, is populated with the calculated differences (Step 24). Preferably, the table includes a default value representing the power loss for an access point transmitted to itself. This may be zero or, alternatively, a value representing the estimated power loss that would be experienced by a user device situated directly below the access point.

|    |   | From AP |   |     |   |
|----|---|---------|---|-----|---|
|    |   | 1       | 2 | ... | N |
| To | 1 |         |   |     |   |
|    | 2 |         |   |     |   |
|    | ... |       |   |     |   |
|    | N |         |   |     |   |

After the table has been populated it can be used to estimate the location of user devices within the wireless network.

To estimate the location of a user device in the wireless network, the power of a signal received by the user device from one or more access points is measured by the user device and reported to the network controller in the wireless network. The power of the signal received from each access point is compared to the known transmission power of that signal and the loss of power of a signal transmitted between the user device and an access point is calculated (Step 26).

Figure 4A:
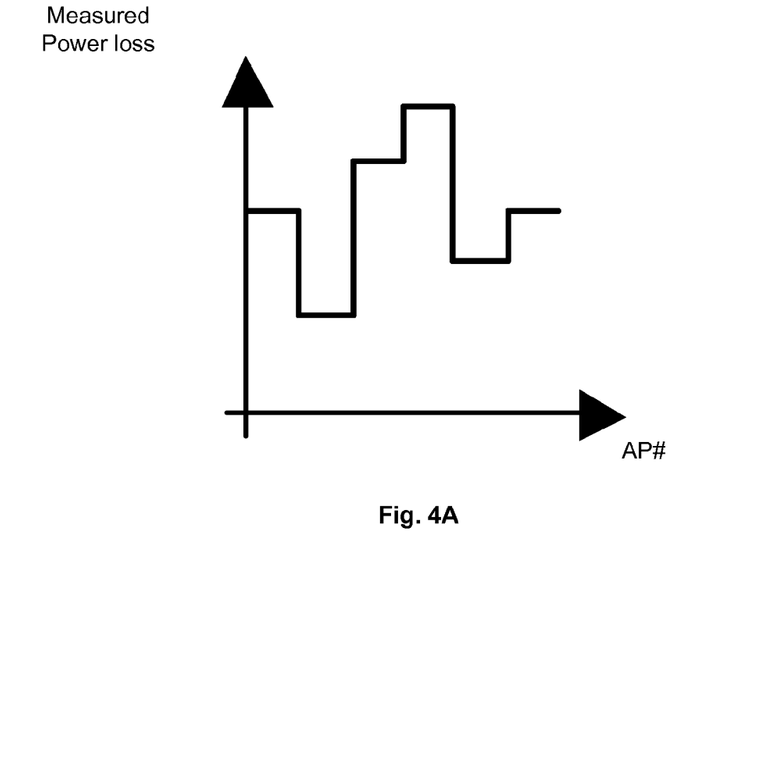
FIG. 4A is a graphical depictation of power loss measured between the user device and access points of the invention.
Figure 4B:
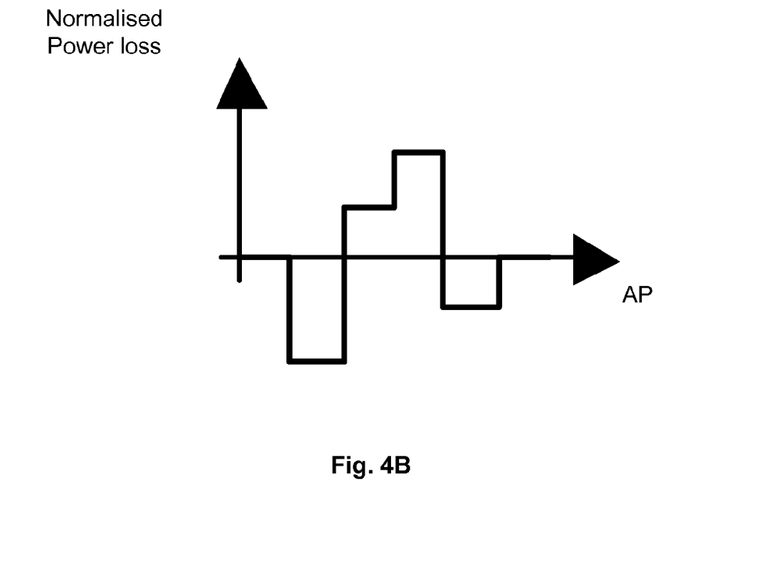
FIG. 4B is a graphical depiction of normalization of power loss measured between the user device and access points of FIG. 4A.
Figure 5:
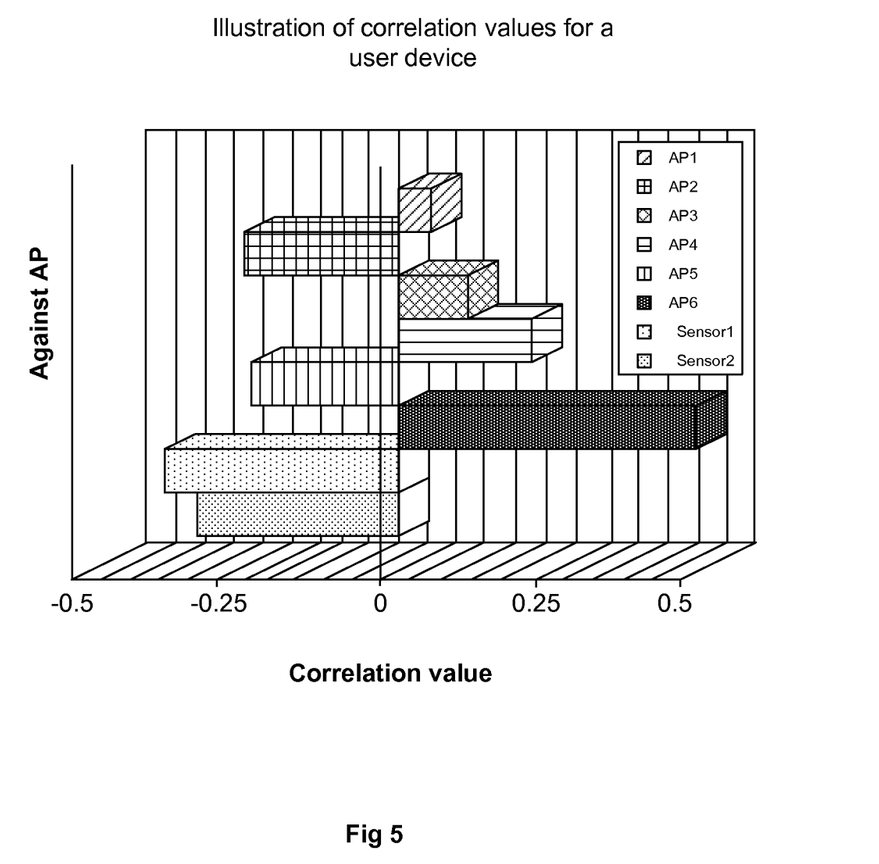
FIG. 5 illustrates a set of correlation values for the user to each AP and sensor in the system.

FIG. 4A is a graphical depiction of power loss measured between the user device and access points. The determined loss of power for the user device is then normalized about the average power loss as described with reference to the transmissions between access points and illustrated in FIG. 4B (Step 28).

The normalised user device power loss is then used to calculate a correlation value for each access point (Step 30). The calculated correlation is the correlation between the power loss of the user device with the set of access points the user device can receive signals from and transmit signals to, and the power loss of an access point and the other access points in the wireless network. The correlation value may, for example, be calculated using the equation:

$$\text{Correlation} = \frac{\sum_N XY - (\sum X)(\sum Y)}{\sqrt{\left(\sum_N X^2 - \left(\sum_N X\right)^2\right)\left(\sum_N Y^2 - \left(\sum_N Y\right)^2\right)}}$$

where

N is the number of access points

X is the normalised power loss between the user device and the Access Point

Y is the normalised power loss between an Access Point and the equivalent Access Point that the user measurement is being made to Once the correlated value for each access point has been determined the correlated values can be normalised, for example by rescaling all values in percentages of the transmission strength or from 0 to 1 (not shown).

The vector position of each of the access points can then be multiplied by the normalised correlated value for that access point to give a weighted vector for the position of the access point (Step 32). The weighted vectors can then be added to each other to give a position estimate for the user device (Step 34).

The estimation can be calculated at any time, for example, when a user device connects to the network, at predetermined time periods, or when a user or controller manually triggers an location estimation calculation.

In an alternative embodiment of the present invention the wireless embodiment further includes one or more sensors. The sensors are configured to receive transmissions from access points and measure the power of received transmissions. The matrix includes data relating not only to power loss which occurs to signals between access points but also data relating to power loss occurring to signals received by a sensor from each of the access points.

Additionally, correlated values, and thereby normalised correlation values, are calculated as described above for signals received by sensors in addition to those received by access points. Thus, the location of the user device can be determined with reference to a larger number of weighted locations thereby increasing the accuracy further. The sensors may be any suitable device which is able to determine the power and, if required, the angle of arrival of a signal received by the sensor.

It is preferable, in order to minimise the number of transmissions in the network, for the sensors to only transmit measurements of power to a network controller or the device estimating the user device location and not to transmit signals to the access points or sensors to measure power loss of a signal, for example, received from an access point. However, if desired the sensors may be configured to transmit signals to other sensors, the access points and/or user devices to enable other sensors, access points and or user devices to measure the power loss of a signal transmitted by the sensor.

In a further embodiment, the correlated values may be used in conjunction with other location estimation methods such as, angle of arrival triangulation or trialateration. For example, the correlated values of the three access points with the greatest correlation with the user device channel loss spectrum may be selected and the distance from the access point to the user device estimated by translating the path loss into a distance. Once the distance has been estimated the location of the user device may be determined by selecting the point where the distances from the access points cross.

Alternatively, if the method is used in conjunction with angle of arrival estimations by triangulation the approximate distance of the user device from an access point can be estimated using the method as described in the first and second embodiments. The angle of arrival of a signal from the user device at the access point is also determined. The location of the user device is then estimated to be the distance of the user device from the location of the access point in the direction of the angle of arrival.

Optionally, a confidence value can be assigned to the location estimation. For example, when determining the location using the method described in the first embodiment the confidence value may be the sum of the percentage error in the power loss measurements for each access point used to determine the location of the user device.

Or when using the method in conjunction with the trilateration method described above the lines may not cross at a point and therefore may define a region within which the user device can be located. The size of the area is inversely proportional to the confidence of the user device being at the precise location it is estimated to be at. A corresponding method may be used when using the method in conjunction with the angle of arrival method as the error in the estimate of angle of arrival, if used with more than one access point will estimate a region within which the user device is located.

As will be understood by one skilled in the art the loss in power of a signal transmission between two access points in the wireless network can be calculated using any suitable method. Additionally, the correlation co-efficient may be calculated using any suitable data and not just power loss data, for example, delay profile.

The power loss may be measured and stored in any suitable unit, for example, it could be measured using a logarithmic scale such as decibels or a linearised power unit.

The location estimate may be performed at any suitable device in, or connected to, devices in the wireless network. For example, it may be performed in the network controller or a separate server located outside the network. Additionally, as will be understood by one skilled in the art, different components of the method may be performed in separate devices, for example, the user device may calculate the power loss for a transmission but the calculation of the correlation value may be performed in a network controller.

The loss in power can then be stored in a table, or any other suitable way to enable it to be accessed at a later date.

The correlated values can be normalised by any suitable method, for example, by rescaling the correlated value for each access point in percentages of the transmission strength.

What is claimed is:

1. A method of estimating location of a user device in a wireless network, the wireless network including a plurality of access points, the method comprising: at server associated with the wireless network, comprising processing hardware and communication hardware:
    receiving, using the communication hardware of the server, information corresponding to channel loss between the user device and a first access point of the plurality of access points;
    determining, by the processing hardware of the server, channel loss between the user device and the first access point based on the information, wherein the user device comprises processing hardware and wireless communication hardware, wherein the first access point comprises processing hardware and wireless communication hardware, wherein the channel loss is determined based on wireless communication between the user device and the first access point using the respective wireless communication hardware;
    estimating, by the processing hardware of the server, the location of the user device from a known location of an access point of the plurality of access points and a correlation value for the first access point, wherein the correlation value for the first access point is a measure of correlation between the channel loss between the user device and the first access point and channel loss between the first access point and each of the plurality of access points; and
    providing services to the user device based on the location of the user device.

2. The method of claim 1, further comprising:
    determining a channel loss between each of the plurality of access points.

3. The method of claim 1, further comprising:
    normalizing the channel loss for the first access point and each of the plurality of access points to determine a normalized access point channel loss; and
    normalizing the channel loss between the user device and the first access point to determine a normalized user device channel loss, wherein the correlation value is a measure of the normalized access point channel loss and normalized user device channel loss.

4. The method of claim 1, wherein estimating the user location comprises normalizing correlation values for each of the plurality of access points prior to estimating the location of the user device.

5. The method of claim 4, wherein estimating the location of the user device comprises multiplying vector locations of each access point by the normalized correlation values for that access point and adding the weighted vector locations together.

6. The method of claim 1, further comprising:
    determining a set of channel losses between the user device and a number of the plurality of access points; and
    calculating correlation values by measuring the set of channel losses and another set of channel losses, the other set of channel losses being a set of channel losses between the first access point and the plurality of access points.

7. The method of claim 6, wherein the number of the plurality of access points comprises:
    one or more access points situated such that they can receive a signal from the user device; or
    one or more access points with the greatest correlation value with the user device channel loss.

8. The method of claim 1, further comprising:
    calculating a number of correlation values between the user device and the plurality of access points, each correlation value being a measure of the correlation between the user device and one access point, wherein estimating the location of the user device is based on the number of correlation values.

9. The method of claim 1, wherein the wireless network further includes one or more sensors and the correlation value for the first access point is a measure of the correlation between the channel loss between the user device and the first access point and the channel loss between the access point and each of the plurality of access points and the one or more sensors.

10. The method of claim 1, further comprising:
    calculating a confidence value for the estimation of user location.

11. An apparatus, configured to estimate a location of a user device in a wireless network, the wireless network including a plurality of access points, the apparatus comprising:
    communication hardware; and
    processing hardware coupled to the communication hardware, wherein the processing hardware is configured to:
        receive, using the communication hardware, an indication of channel loss between the user device and a first access point of the plurality of access points, wherein the user device comprises processing hardware and wireless communication hardware, wherein the first access point comprises processing hardware and wireless communication hardware, wherein the channel loss is determined based on wireless communication between the user device and the first access point using the respective wireless communication hardware;
        estimate, using the processing hardware, the location of the user device from a known location of an access point of the plurality of access points and a correlation value for the first access point, wherein the correlation value for the first access point is a measure of correlation between the channel loss between the user device and the first access point and channel loss between the first access point and each of the plurality of access points; and provide services to the user device based on the location of the user device.

12. The apparatus of claim 11, wherein the processing hardware is further configured to:
 determine a channel loss between each of the plurality of access points.

13. The apparatus of claim 11, wherein the processing hardware is further configured to:
 normalize the channel loss for the first access point and each of the plurality of access points to determine a normalized access point channel loss; and
 normalize the channel loss between the user device and the first access point to determine a normalized user device channel loss, wherein the correlation value is a measure of the normalized access point channel loss and normalized user device channel loss.

14. The apparatus of claim 11, wherein the processing hardware is further configured to:
 determine a set of channel losses between the user device and a number of the plurality of access points; and
 calculate correlation values by measuring the set of channel losses and another set of channel losses, the other set of channel losses being a set of channel losses between the first access point and the plurality of access points.

15. The apparatus of claim 11, wherein the processing hardware is further configured to:
 calculate a number of correlation values between the user device and the plurality of access points, each correlation value being a measure of the correlation between the user device and one access point, wherein estimating the location of the user device is based on the number of correlation values.

16. The apparatus of claim 11, wherein the apparatus comprises a network controller of the wireless network.

17. A non-transitory, computer accessible memory medium storing program instructions for estimating a location of a user device in a wireless network, the wireless network including a plurality of access points, wherein the program instructions are executable by a processor of a server associated with the wireless network to:
 receive an indication of channel loss between the user device and a first access point of the plurality of access points, wherein the user device comprises processing hardware and wireless communication hardware, wherein the first access point comprises processing hardware and wireless communication hardware, wherein the channel loss is determined based on wireless communication between the user device and the first access point using the respective wireless communication hardware;
 estimate the location of the user device from a known location of an access point of the plurality of access points and a correlation value for the first access point, wherein the correlation value for the first access point is a measure of correlation between the channel loss between the user device and the first access point and channel loss between the first access point and each of the plurality of access points; and
 provide services to the user device based on the location of the user device.

18. The non-transitory, computer accessible memory medium of claim 17, wherein the program instructions are further executable to:
 normalize the channel loss for the first access point and each of the plurality of access points to determine a normalized access point channel loss; and
 normalize the channel loss between the user device and the first access point to determine a normalized user device channel loss, wherein the correlation value is a measure of the normalized access point channel loss and normalized user device channel loss.

19. The non-transitory, computer accessible memory medium of claim 17, wherein the program instructions are further executable to:
 determine a set of channel losses between the user device and a number of the plurality of access points; and
 calculate correlation values by measuring the set of channel losses and another set of channel losses, the other set of channel losses being a set of channel losses between the first access point and the plurality of access points.

20. The non-transitory, computer accessible memory medium of claim 17, wherein the program instructions are further executable to:
 calculate a number of correlation values between the user device and the plurality of access points, each correlation value being a measure of the correlation between the user device and one access point, wherein estimating the location of the user device is based on the number of correlation values.

* * * * *